(12) United States Patent
Kitajima

(10) Patent No.: US 11,115,637 B2
(45) Date of Patent: Sep. 7, 2021

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/716,070

(22) Filed: Dec. 16, 2019

(65) Prior Publication Data
US 2020/0204775 A1 Jun. 25, 2020

(30) Foreign Application Priority Data
Dec. 19, 2018 (JP) .............................. JP2018-237617

(51) Int. Cl.
| H04N 9/73 | (2006.01) |
| H04N 5/225 | (2006.01) |
| H04N 5/262 | (2006.01) |

(52) U.S. Cl.
CPC ........... *H04N 9/735* (2013.01); *H04N 5/2256* (2013.01); *H04N 5/2621* (2013.01)

(58) Field of Classification Search
CPC ............ H04N 9/735; H04N 9/74; H04N 9/73; H04N 9/77; H04N 9/07; H04N 5/2256; H04N 5/2621; G06T 5/002; G06T 5/008; G06T 2207/10024; G03B 7/08; G03B 7/28

USPC ....................................................... 348/224.1
See application file for complete search history.

(56) References Cited

U.S. PATENT DOCUMENTS

| 7,539,342 | B2* | 5/2009 | Tabata ..................... G06T 5/008 358/518 |
| 8,248,485 | B2* | 8/2012 | Ishii ...................... H04N 5/2354 348/222.1 |
| 8,554,010 | B2* | 10/2013 | Hasegawa ............ H04N 5/2355 382/274 |
| 8,698,804 | B2* | 4/2014 | Tomite .................... G06T 15/60 345/426 |
| 8,830,348 | B2* | 9/2014 | Nomura ............. G06K 9/00255 348/223.1 |
| 9,652,662 | B2* | 5/2017 | Hirashima .............. G06T 11/60 |
| 10,057,503 | B2* | 8/2018 | Suzuki ................... H04N 5/243 |
| 10,796,418 | B2* | 10/2020 | Tada ....................... G06T 5/008 |

(Continued)

FOREIGN PATENT DOCUMENTS

JP 2015-032991 A 2/2015

*Primary Examiner* — Pritham D Prabhakher
(74) *Attorney, Agent, or Firm* — Cowan, Liebowitz & Latman, P.C.

(57) ABSTRACT

There is provided an image processing apparatus comprising. An identification unit identifies a target color that a pixel of a shot image corresponding to an object having a specific color is to have as a result of white balance processing performed on the shot image. A determination unit determines a target region of a virtual light source in the shot image. An image processing unit performs image processing for adding an effect of virtual light irradiation by the virtual light source to the target region. A control unit controls a color of the virtual light source such that a color close to the target color approaches the target color in the target region.

12 Claims, 12 Drawing Sheets

(56) References Cited

U.S. PATENT DOCUMENTS

| | | | | |
|---|---|---|---|---|
| 2005/0243175 | A1* | 11/2005 | Yamada | H04N 9/735 |
| | | | | 348/207.1 |
| 2005/0271295 | A1* | 12/2005 | Tabata | G06T 5/002 |
| | | | | 382/274 |
| 2007/0165960 | A1* | 7/2007 | Yamada | H04N 9/735 |
| | | | | 382/254 |
| 2010/0194919 | A1* | 8/2010 | Ishii | H04N 9/735 |
| | | | | 348/224.1 |
| 2012/0274775 | A1* | 11/2012 | Reiffel | G06Q 30/08 |
| | | | | 348/158 |
| 2013/0154985 | A1* | 6/2013 | Miyazaki | G06F 3/0421 |
| | | | | 345/173 |
| 2013/0300894 | A1* | 11/2013 | Imai | H04N 5/23229 |
| | | | | 348/229.1 |
| 2015/0178550 | A1* | 6/2015 | Hirashima | G06K 9/00268 |
| | | | | 382/118 |
| 2017/0186222 | A1* | 6/2017 | Hata | H04N 5/2621 |
| 2017/0244882 | A1* | 8/2017 | Kitajima | H04N 5/2352 |
| 2018/0350048 | A1* | 12/2018 | Tada | G06T 5/008 |
| 2019/0104246 | A1* | 4/2019 | Antretter | G03B 7/16 |

* cited by examiner

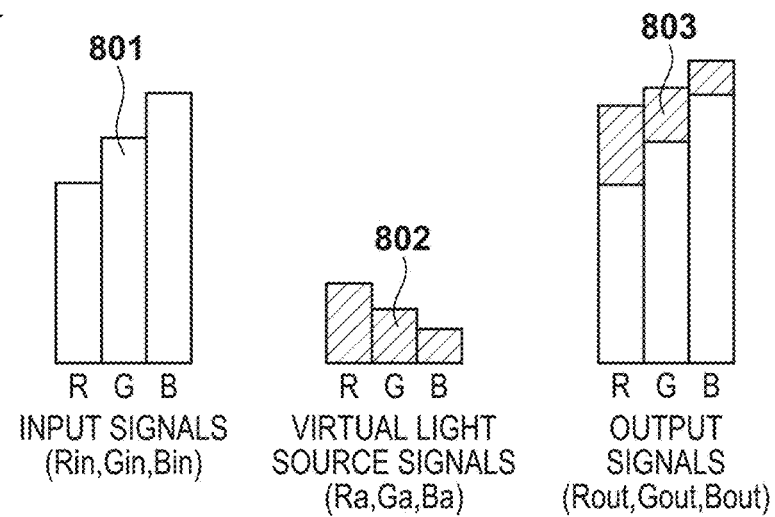
FIG. 8A
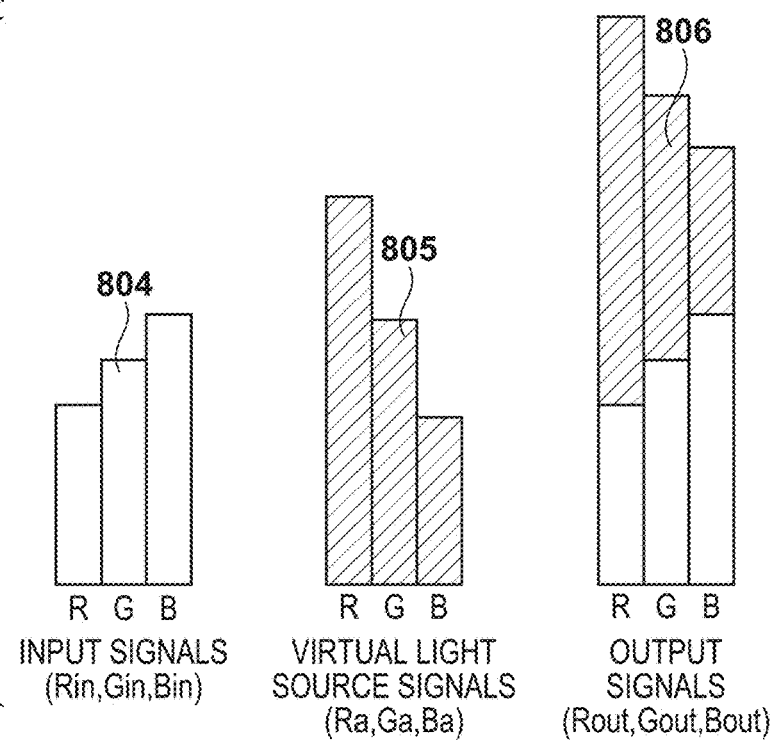
FIG. 8B
FIG. 8C

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Conventionally, in photography, there are cases where regions of light and shadow that occur in an object are adjusted through adjustment of light with auxiliary lighting, reflector boards and the like. Photography that variously changes the feel of the object thereby becomes possible.

Also, as a technology for performing such adjustment of light after shooting, there is a method that involves adding pseudo light to an object region. It thereby becomes possible to correct dark portions of an image or to emphasize the three-dimensionality. For example, Japanese Patent Laid-Open No. 2015-032991 discloses a digital lighting processing means for performing virtual lighting processing on a shot image. Specifically, processing for dividing an object into partial regions and increasing the brightness of partial regions that satisfy a condition is performed. It thereby becomes possible to correct shadow portions to be brighter.

However, with the method of Japanese Patent Laid-Open No. 2015-032991, only the brightness of the object is controlled, and thus there is a problem in that the color of the region that has undergone virtual lighting processing may be unnatural. For example, in the case where sunlight hits the object obliquely, there will be regions that are directly irradiated by sunlight and shadow regions where sunlight does not hit. The shadow regions of the object may be affected by diffused light and be slightly bluish, compared with the regions that are directly irradiated by sunlight. Since the shadow regions of the object are brightened with a bluish tinge when virtual lighting processing that corrects only brightness is carried out on the shadow regions at this time, the color of the shadow regions will be unnatural compared with the regions that sunlight hits directly.

SUMMARY OF THE INVENTION

The present invention has been made in view of such circumstances, and provides a technology for suppressing the unnatural coloring of regions to which the effect of virtual light irradiation by a virtual light source is added.

According to a first aspect of the present invention, there is provided an image processing apparatus comprising: an identification unit configured to identify a target color that a pixel of a shot image corresponding to an object having a specific color is to have as a result of white balance processing performed on the shot image; a determination unit configured to determine a target region of a virtual light source in the shot image; an image processing unit configured to perform image processing for adding an effect of virtual light irradiation by the virtual light source to the target region; and a control unit configured to control a color of the virtual light source such that a color close to the target color approaches the target color in the target region.

According to a second aspect of the present invention, there is provided an image processing apparatus comprising: an identification unit configured to identify a target color that a pixel of a shot image corresponding to an object having a specific color is to have as a result of white balance processing performed on the shot image; a determination unit configured to determine a target region of a virtual light source in the shot image; an image processing unit configured to perform image processing for adding an effect of virtual light irradiation by the virtual light source to the target region; an adjustment unit configured to adjust a white balance of the target region to which the effect of virtual light irradiation has been added, such that a color close to the target color approaches the target color; and a control unit configured to control a degree of the adjustment of the white balance, based on a degree of contribution of the effect of virtual light irradiation on a pixel value of the target region to which the effect has been added.

According to a third aspect of the present invention, there is provided an image capturing apparatus comprising: the image processing apparatus according to the first aspect; an image capturing unit configured to generate the shot image; and a white balance unit configured to perform white balance processing on the shot image generated by the image capturing unit.

According to a fourth aspect of the present invention, there is provided an image processing method executed by an image processing apparatus, comprising: identifying a target color that a pixel of a shot image corresponding to an object having a specific color is to have as a result of white balance processing performed on the shot image; determining a target region of a virtual light source in the shot image; performing image processing for adding an effect of virtual light irradiation by the virtual light source to the target region; and controlling a color of the virtual light source such that a color close to the target color approaches the target color in the target region.

According to a fifth aspect of the present invention, there is provided an image processing method executed by an image processing apparatus, comprising: identifying a target color that a pixel of a shot image corresponding to an object having a specific color is to have as a result of white balance processing performed on the shot image; determining a target region of a virtual light source in the shot image; performing image processing for adding an effect of virtual light irradiation by the virtual light source to the target region; adjusting a white balance of the target region to which the effect of virtual light irradiation has been added, such that a color close to the target color approaches the target color; and controlling a degree of the adjustment of the white balance, based on a degree of contribution of the effect of virtual light irradiation on a pixel value of the target region to which the effect has been added.

According to a sixth aspect of the present invention, there is provided a non-transitory computer-readable storage medium which stores a program for causing a computer to execute an image processing method comprising: identifying a target color that a pixel of a shot image corresponding to an object having a specific color is to have as a result of white balance processing performed on the shot image; determining a target region of a virtual light source in the shot image; performing image processing for adding an effect of virtual light irradiation by the virtual light source to the target region; and controlling a color of the virtual light source such that a color close to the target color approaches the target color in the target region.

According to a seventh aspect of the present invention, there is provided a non-transitory computer-readable storage medium which stores a program for causing a computer to execute an image processing method comprising: identifying a target color that a pixel of a shot image corresponding to an object having a specific color is to have as a result of white balance processing performed on the shot image; determining a target region of a virtual light source in the shot image; performing image processing for adding an effect of virtual light irradiation by the virtual light source to the target region; adjusting a white balance of the target region to which the effect of virtual light irradiation has been added, such that a color close to the target color approaches the target color; and controlling a degree of the adjustment of the white balance, based on a degree of contribution of the effect of virtual light irradiation on a pixel value of the target region to which the effect has been added.

Further features of the present invention will become apparent from the following description of exemplary embodiments with reference to the attached drawings.

BRIEF DESCRIPTION OF THE DRAWINGS

FIGS. 8A and 8B are diagrams showing the relationship between input signals and signals after lighting by a virtual light source.

FIG. 8C is a diagram showing a correction function of color gain of a virtual light source.

DESCRIPTION OF THE EMBODIMENTS

Figure 1:
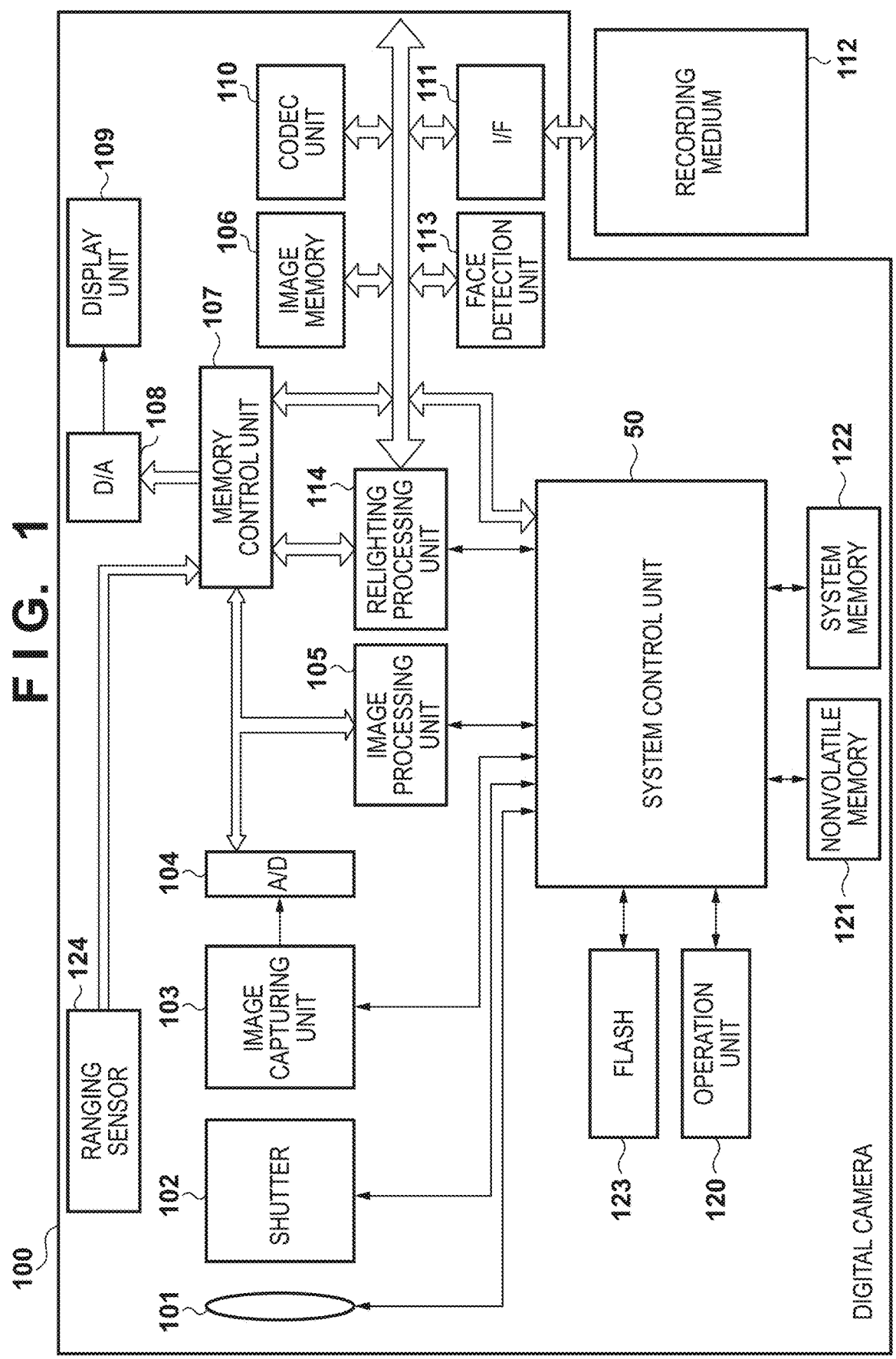
FIG. 1 is a block diagram showing a configuration of a digital camera 100.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

In the following embodiments, description will be given taking a configuration in which an image processing apparatus is applied to a digital camera (image capturing apparatus) as an example.

First Embodiment

FIG. 1 is a block diagram showing a configuration of a digital camera 100. In FIG. 1, reference numeral 101 denotes a group of lenses that includes a zoom lens and a focus lens. Reference numeral 102 denotes a shutter that has a diaphragm function. Reference numeral 103 denotes an image capturing unit that is constituted by a CCD or CMOS device or the like that converts optical images into electrical signals. Reference numeral 104 denotes an A/D converter that converts analog signals into digital signals. Reference numeral 105 denotes an image processing unit that performs various image processing such as white balance processing, gamma processing, edge enhancement processing and color correction processing on image data that is output by the A/D converter 104. Reference numeral 106 denotes an image memory. Reference numeral 107 denotes a memory control unit that controls the image memory 106. Reference numeral 108 denotes a D/A converter that converts input digital signals into analog signals. Reference numeral 109 denotes a display unit that includes an LCD or the like. Reference numeral 110 denotes a codec unit that compression encodes and decodes image data.

Reference numeral 111 denotes an interface (I/F) with a recording medium 112. Reference numeral 112 denotes a recording medium such as a memory card or a hard disk. Reference numeral 113 denotes a face detection unit that detects regions in which faces appear within shot images. Reference numeral 114 is a relighting processing unit that performs relighting processing on shot images. Reference numeral 50 denotes a system control unit that controls the overall system of the digital camera 100. Reference numeral 121 denotes a nonvolatile memory such as an EEPROM that stores programs, parameters and the like. Reference numeral 122 denotes a system memory to which constants, variables, programs read out from the nonvolatile memory 121 and the like for use in operations by the system control unit 50 are extracted. Reference numeral 123 denotes a flash (light source apparatus). Reference numeral 124 denotes a ranging sensor that measures the distance to an object, and outputs distance information corresponding to pixel units of the shot image as a two-dimensional distance map image.

Next, basic operations at the time of shooting an object in the digital camera 100 configured as described above will be described. The image capturing unit 103 photoelectrically converts light that is incident via the lens 101 and the shutter 102, and outputs the resultant analog signals to the A/D converter 104 as input image signals. The A/D converter 104 converts the analog image signals that are output by the image capturing unit 103 into digital image signals, and outputs the digital image signals to the image processing unit 105.

The image processing unit 105 performs gamma processing, edge enhancement processing, color conversion processing such as white balance and the like on image data from the A/D converter 104 or image data from the memory control unit 107. Also, the image processing unit 105 performs predetermined evaluation value calculation processing using the face detection result of the face detection unit 113 or captured image data. The system control unit 50 performs exposure control and ranging control based on obtained evaluation values. AF (auto focus) processing, AE (auto exposure) processing, AWB (auto white balance) processing and the like that employ a TTL (Through-The-Lens) system can thereby be performed.

Image data output by the image processing unit 105 is written to the image memory 106 via the memory control unit 107. The image memory 106 stores image data output by the image capturing unit 103 and image data for displaying on the display unit 109. The D/A converter 108 converts data for image display that is stored in the image memory 106 into analog signals and supplies the analog signals to the display unit 109. The display unit 109 performs display that depends on the analog signals from the D/A converter 108 on a display device such as an LCD.

The codec unit 110 compression encodes image data recorded in the image memory 106, based on a standard such as JPEG or MPEG. The system control unit 50 stores encoded image data in the recording medium 112 via the I/F 111.

Hereinabove, the basic operations at the time of shooting an object have been described. Besides the above basic operations, the system control unit 50 realizes various processing of the present embodiment which will be described later, by executing programs recorded in the aforementioned nonvolatile memory 121. The programs referred to here are programs for executing various flowcharts described later in the present embodiment. At this time, constants, variables, programs read out from the nonvolatile memory 121 and the like for use in operations by the system control unit 50 are extracted to the system memory 122.

Figure 2:
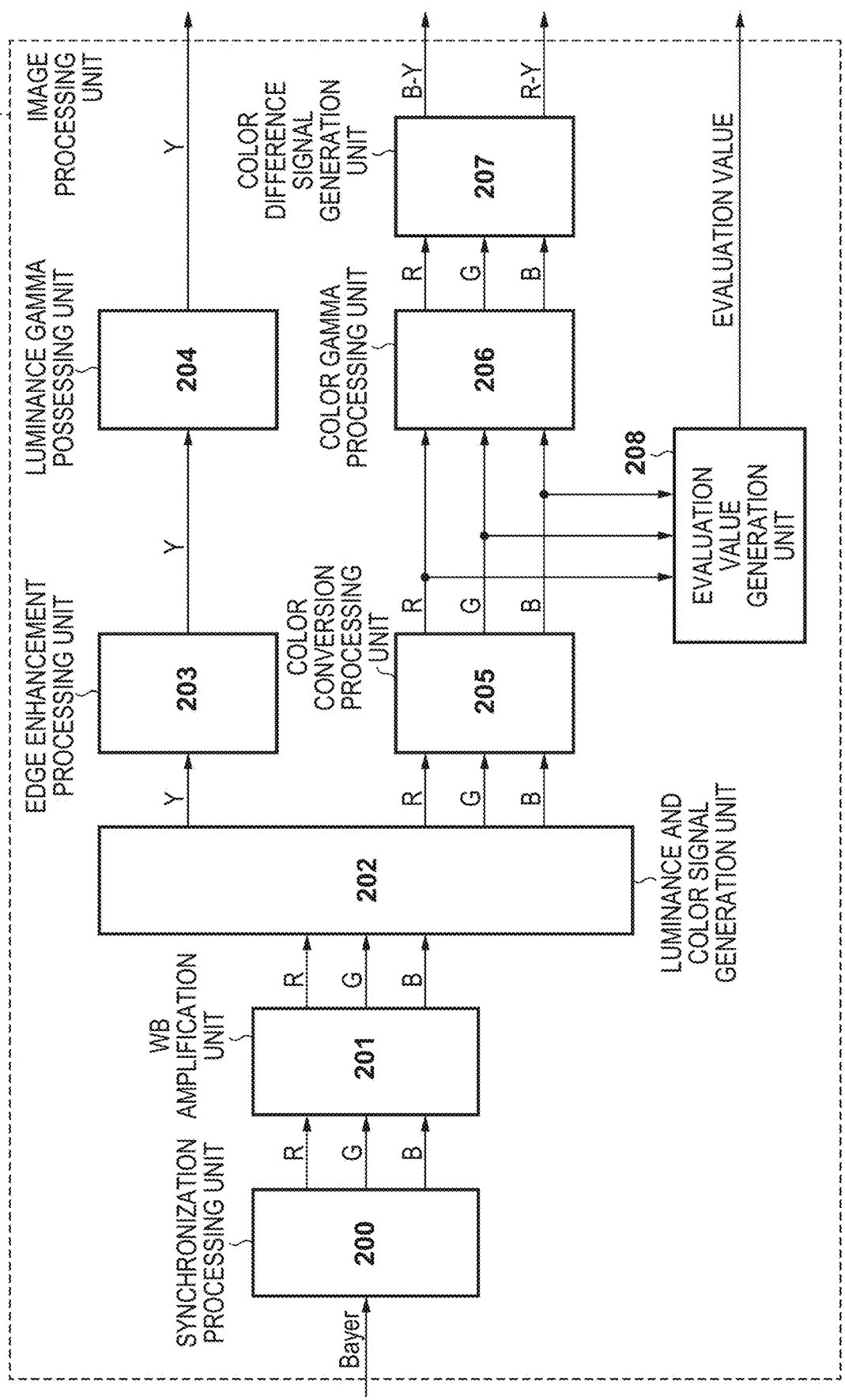
FIG. 2 is a block diagram showing a configuration of an image processing unit 105.

Next, the image processing unit 105 will be described in detail, with reference to FIG. 2. FIG. 2 is a block diagram showing a configuration of the image processing unit 105. In FIG. 2, reference numeral 200 denotes a synchronization processing unit, 201 denotes a WB amplification unit, and 202 denotes a luminance and color signal generation unit. Reference numeral 203 denotes an edge enhancement processing unit, 204 denotes a luminance gamma possessing unit, 205 denotes a color conversion processing unit, 206 denotes a color gamma processing unit, and 207 denotes a color difference signal generation unit. Also, reference numeral 208 is an evaluation value generation unit that outputs feature information of images.

Operations in the image processing unit 105 will now be described. The image signals output by the A/D converter 104 of FIG. 1 are input to the image processing unit 105. The image signals input to the image processing unit 105 are input to the synchronization processing unit 200. The synchronization processing unit 200 performs synchronization processing on the input image data which is in RGB Bayer array format, and generates color signals R, G and B.

The WB amplification unit 201 applies gain to the RGB color signals, based on a white balance gain value that is calculated by the system control unit 50, and adjusts the white balance. As the white balance gain value set in the WB amplification unit 201, a correction value is set such that the color of ambient light serving as the main light source on the object approaches an achromatic color, for example.

The method of calculating the white balance gain will be specifically described below. The calculation first involves calculating an evaluation value of the input image. The evaluation value generation unit 208 divides the input image into a plurality of blocks as show in FIG. 6A, and calculates the average value of the RGB values for every block as an evaluation value. The evaluation value generation unit 208 outputs the calculated evaluation values to the system memory 122.

Note that, in FIG. 2, the evaluation value generation unit 208 is shown in a position downstream of the WB amplification unit 201, but the evaluation value generation unit 208 is configured to also be capable of calculating evaluation values for input images prior to white balance adjustment.

The system control unit 50 acquires the evaluation values (RGB average value for each block) generated by the evaluation value generation unit (208 in FIG. 2). The system control unit 50 extracts a block close to an achromatic color (white) from all the blocks within the image, based on the acquired evaluation values. Achromatic color (white) extraction will now be described using FIGS. 7A and 7B.

Figure 7A:
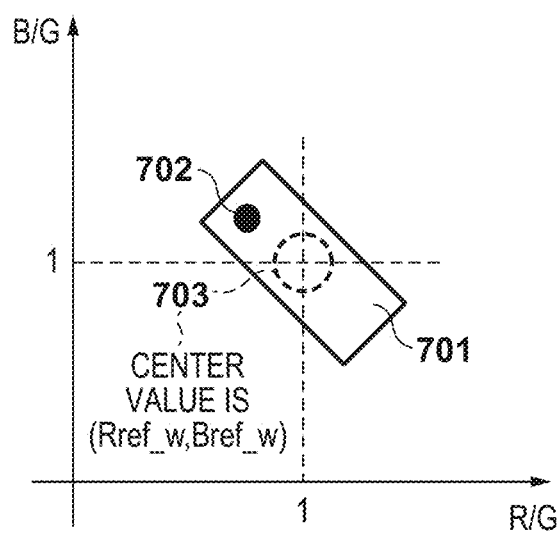
FIG. 7A is a diagram illustrating extraction of an achromatic color region.

FIG. 7A is a graph showing the color distribution, with R/G taken on the horizontal axis and B/G taken on the vertical axis. Since R=G=B in the case of an achromatic color, the vicinity of 1 will be an achromatic color on both the horizontal and vertical axes. In the present embodiment, the system control unit 50 judges that a block is an achromatic color block in the case where the color of the block is in a proximal range 701 of the achromatic color in the graph of FIG. 7A. The system control unit 50, in the case where there are achromatic color blocks, counts the number of those blocks, and calculates the average value (Rwb, Gwb, Bwb) of the RGB values of the blocks judged to be the achromatic color. Since the calculated RGB average values (Rwb, Gwb, Bwb) reflect the color of ambient light, the system control unit 50 calculates a white balance gain that result in Rwb=Gwb=Bwb, and sets the calculated white balance gain in the WB amplification unit 201.

The WB amplification unit 201 inputs RGB signals adjusted for white balance to the luminance and color signal generation unit 202.

The luminance and color signal generation unit 202 generates a luminance signal Y from the RGB signals, and outputs the generated luminance signal Y to the edge enhancement processing unit 203 and the color signals RGB to the color conversion processing unit 205.

The edge enhancement processing unit 203 performs edge enhancement processing on the luminance signal Y, and outputs the resultant luminance signal Y to the luminance gamma possessing unit 204. The luminance gamma possessing unit 204 performs gamma correction on the luminance signal Y, and outputs the resultant luminance signal Y to the image memory 106. The color conversion processing unit 205 performs desired color balance conversion through processing such as a matrix operation on the RGB signals. The color gamma processing unit 206 performs gamma correction on the RGB color signals. The color difference signal generation unit 207 generates color difference signals R−Y and B−Y from the RGB signals, and outputs the color difference signals to the image memory 106. The image signals (Y, R−Y, B−Y) output to the image memory 106 are compression encoded by the codec unit 110, and recorded to the recording medium 112. The RGB signals output by the color conversion processing unit 205 are also input to the evaluation value generation unit 208. The evaluation value generation unit 208, as aforementioned, divides the image corresponding to the input RGB signals into a plurality of blocks as show in FIG. 6A, and calculates, for each block, the average value of the RGB values in the block as an evaluation value. The evaluation value generation unit 208 outputs the calculated evaluation values to the system memory 122.

Next, the configuration and operations of the relighting processing unit 114 will be described, with reference to FIG. 3. In the case where relighting processing is selected by a user operation on an operation unit 120, the image data output by the image processing unit 105 is input to the relighting processing unit 114, and relighting processing using the virtual light source is performed.

Figure 3:
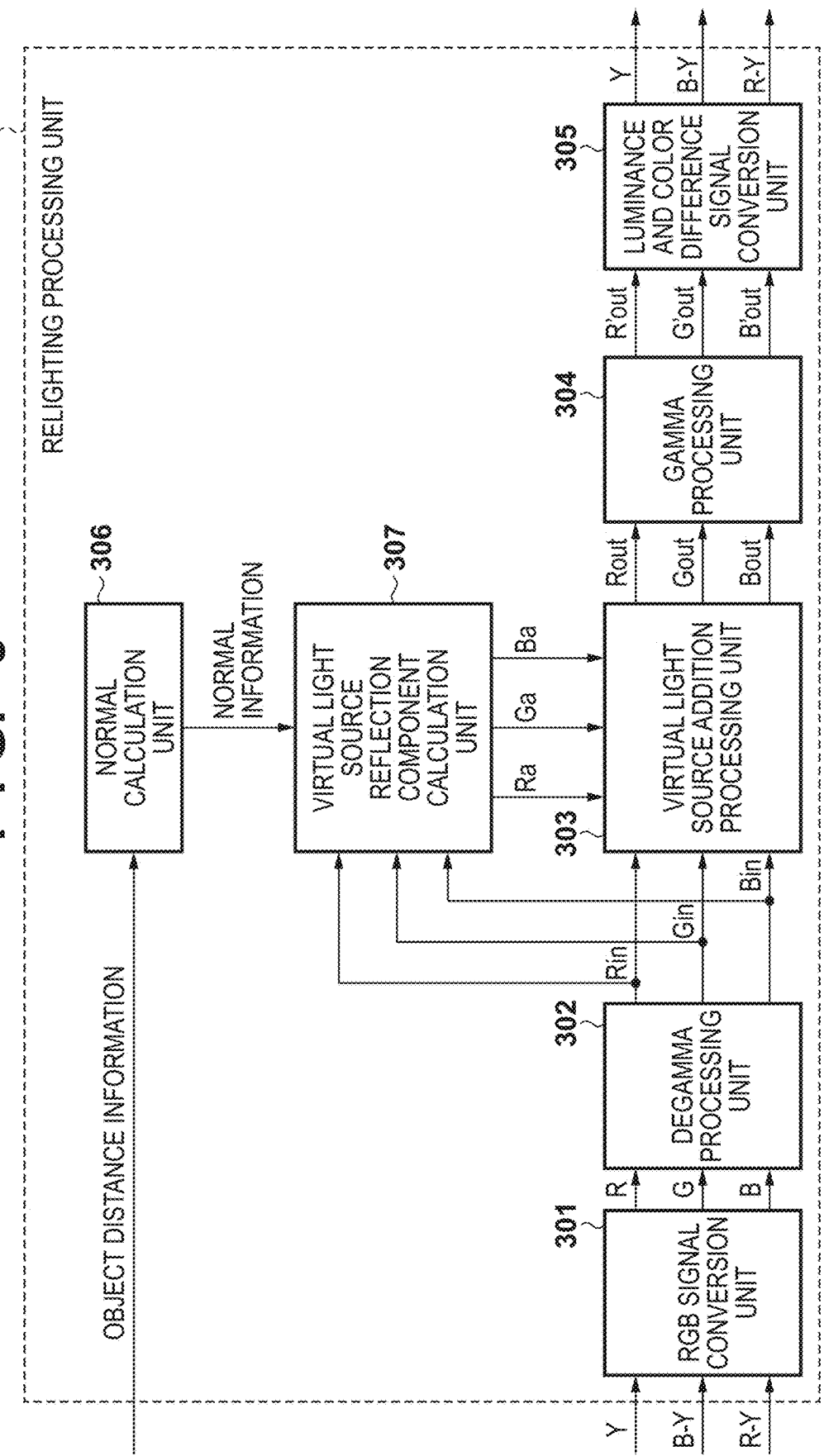
FIG. 3 is a block diagram showing a configuration of a relighting processing unit 114 according to a first embodiment.

FIG. 3 is a block diagram showing a configuration of the relighting processing unit 114. In FIG. 3, reference numeral 301 denotes an RGB signal conversion unit that converts input luminance and color difference signals (Y, B–Y, R–Y) into RGB signals. Reference numeral 302 denotes a degamma processing unit that performs degamma processing. Reference numeral 303 denotes a virtual light source addition processing unit that adds the components of irradiated light of the virtual light source reflected by the object to the image data. Reference numeral denotes 304 is a gamma processing unit that applies a gamma characteristic to the RGB signals. Reference numeral 305 denotes a luminance and color difference signal conversion unit that converts RGB signals into luminance and color difference signals (Y, B–Y, R–Y). Reference numeral 306 denotes a normal calculation unit that calculates the normal of an object from object distance information that is output by the ranging sensor 124. Reference numeral 307 denotes a virtual light source reflection component calculation unit that calculates the components of irradiated light of the virtual light source reflected by the object.

Operations of the relighting processing unit 114 having the above configuration will now be described. The relighting processing unit 114 reads out the luminance and color difference signals (Y, B–Y, R–Y) recorded in the image memory 106, and inputs the luminance and color difference signals to the RGB signal conversion unit 301. The RGB signal conversion unit 301 converts the input luminance and color difference signals (Y, B–Y, R–Y) into RGB signals, and outputs the RGB signals to the degamma processing unit 302. The degamma processing unit 302 calculates the opposite characteristic to the gamma characteristic applied in the gamma processing by the image processing unit 105, and converts the RGB signals into linear data. The degamma processing unit 302 outputs the RGB signals (Rin, Gin, Bin) after linear conversion to the virtual light source reflection component calculation unit 307 and the virtual light source addition processing unit 303.

On the other hand, the normal calculation unit 306 calculates a normal map from the object distance information acquired from the ranging sensor 124. The object distance information is two-dimensional distance information obtained in pixel units of the shot image. In relation to the method of generating the normal map from the object distance information, any known technology can be used, and a specific processing example will now be described using FIG. 4.

Figure 4:
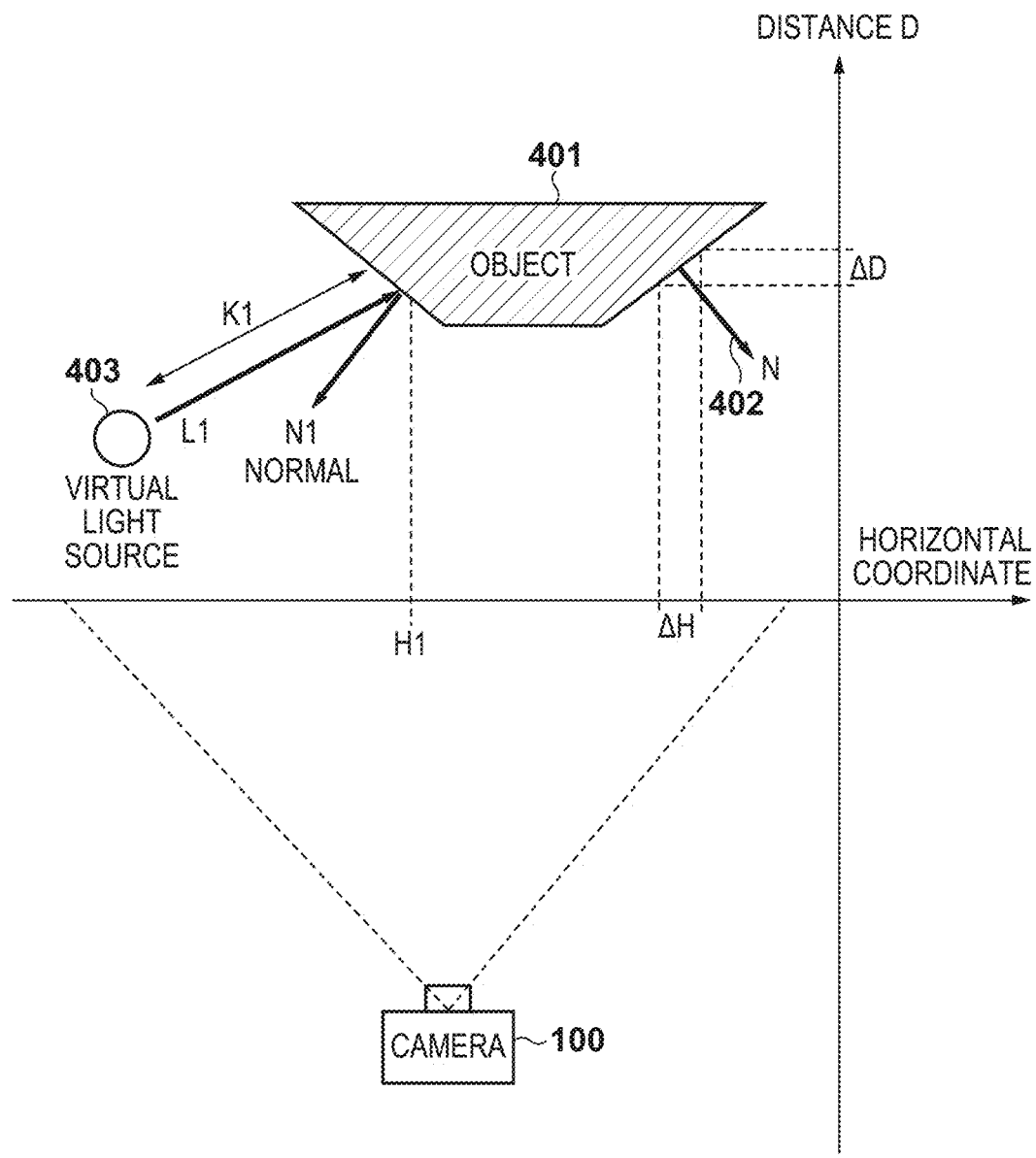
FIG. 4 is a diagram showing the relationship between camera shooting coordinates and an object.

FIG. 4 is a diagram showing the relationship between camera shooting coordinates and an object. For example, the case of calculating a normal N402 of an object 401 shown in FIG. 4 will be considered. In this case, it is possible for the normal calculation unit 306 to calculate gradient information from a difference ΔD of a distance (depth) D with respect to a difference ΔH of a shot image in the horizontal direction, and to calculate the normal N402 from the gradient information. The normal calculation unit 306, by performing the above processing on each pixel of the shot image, calculates normal information corresponding to each pixel of the shot image. The normal calculation unit 306 outputs the normal information calculated for each pixel of the shot image as a normal map to the virtual light source reflection component calculation unit 307.

The virtual light source reflection component calculation unit 307 calculates the reflection components (Ra, Ga, Ba) of the irradiated light of the installed virtual light source reflected by the object. Calculation of the reflection components of the virtual light source will now be described using FIG. 4. The case where the virtual light source is installed in a position 403 will be considered in FIG. 4. The reflection components at a horizontal pixel position H1 of an image shot with the digital camera 100 will be a value proportional to the inner product of a normal vector N1 and a direction vector L1 of the virtual light source at the horizontal pixel position H1, and inversely proportional to the square of the distance K1 between the virtual light source and the object position. Note that, in FIG. 4, the vertical pixel position is omitted for simplification of description. When this relationship is represented with a formula, the reflection components (Ra, Ga, Ba) due to the virtual light source will be as follows.

$$Ra = \alpha \times \frac{(-L \cdot N)}{K^2} \times Rin \times Rcolor$$

$$Ga = \alpha \times \frac{(-L \cdot N)}{K^2} \times Gin$$

$$Ba = \alpha \times \frac{(-L \cdot N)}{K^2} \times Bin \times Bcolor$$

Formula 1

Here, α is the magnitude of the gain of the virtual light source (intensity of the virtual light source), L is a three-dimensional direction vector of the virtual light source, N is a three-dimensional normal vector of the object, and K is the distance between the virtual light source and the object. The magnitudes of N and K are normalized to 1. Rin, Gin, and Bin are the RGB signals output by the degamma processing unit 302. Rcolor and Bcolor are parameters for controlling the color of the virtual light source, and are determined based on processing that will be described later.

Note that, here, the case where there is one virtual light source is described, but it is also possible to set a plurality of virtual light sources, and to control parameters for each virtual light source.

Referring again to FIG. 3, the reflection components (Ra, Ga, Ba) due to the virtual light source calculated as described above are output to the virtual light source addition processing unit 303. The virtual light source addition processing unit 303 performs the following processing for adding the reflection components (Ra, Ga, Ba) to the object region.

Rout=Rin+Ra

Gout=Gin+Ga

Bout=Bin+Ba

Formula 2

The image signals (Rout, Gout, Bout) output by the virtual light source addition processing unit 303 are input to the gamma processing unit 304. The gamma processing unit 304 performs gamma correction on the input RGB signals, and outputs the gamma-corrected RGB signals (R'out, G'out, B'out) to the luminance and color difference signal conversion unit 305. The luminance and color difference signal conversion unit 305 generates a luminance signal Y and color difference signals R–Y and B–Y from the RGB signals.

The operations of the relighting processing unit 114 are as described above. The system control unit 50 performs compression encoding with the codec unit 110, after storing the luminance and color difference signals output by the relighting processing unit 114 in the image memory 106, under the control of the memory control unit 107. Also, the system control unit 50 records the compression-encoded image data in the recording medium 112 via the I/F 111.

Figure 5:
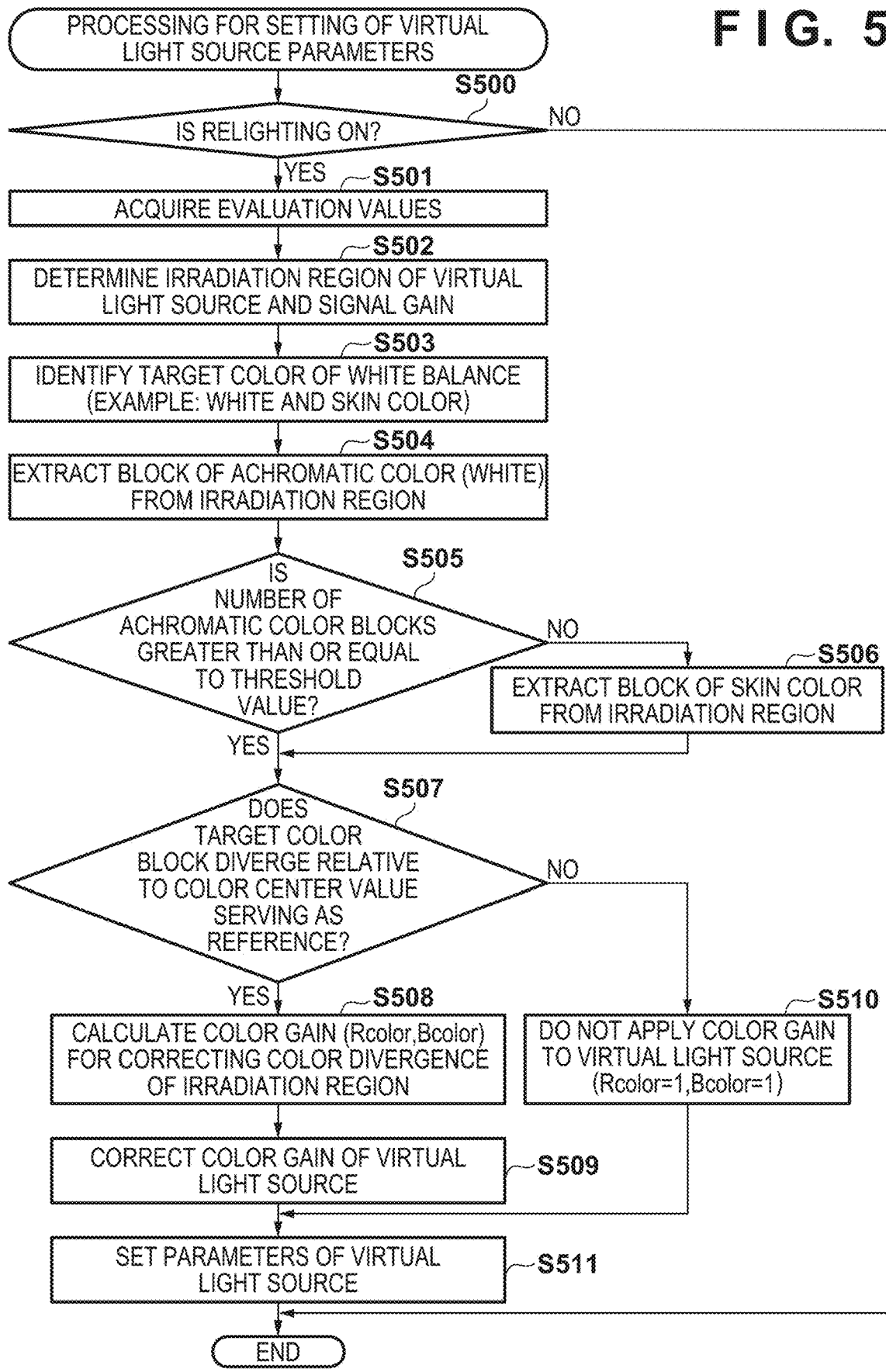
FIG. 5 is a flowchart of processing for setting virtual light source parameters according to the first embodiment.

Next, the processing flow for setting the parameters of the virtual light source including the parameters (Rcolor, Bcolor) for controlling the color of the virtual light source will be described, with reference to FIG. 5. The processing of the steps of the flowchart of FIG. 5 are realized by the system control unit 50 executing a program stored in the nonvolatile memory 121, unless stated otherwise. The processing of this flowchart starts when processing by the image processing unit 105 on the shot image is completed.

In step S500, the system control unit 50 determines whether the operation mode of the digital camera 100 is set to a mode in which relighting processing using a virtual light source is enabled. In the case of being in a mode in which relighting processing is enabled, the processing advances to step S501, and if not, the processing ends.

Figure 6A:
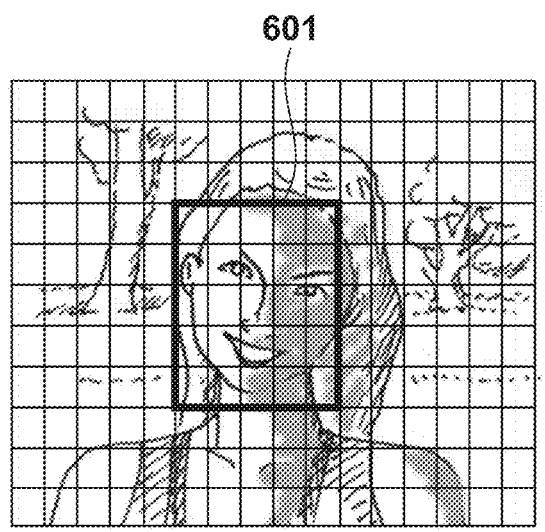
FIGS. 6A to 6C are diagrams illustrating a method of determining a region to be irradiated with a virtual light source.

In step S501, the system control unit 50 acquires the evaluation values generated by the evaluation value generation unit 208 (FIG. 2). The evaluation values referred to here are values acquired by dividing the shot image into a plurality of blocks as shown in FIG. 6A, and calculating, for each block, the average value of the RGB values in the block.

Figure 6B:
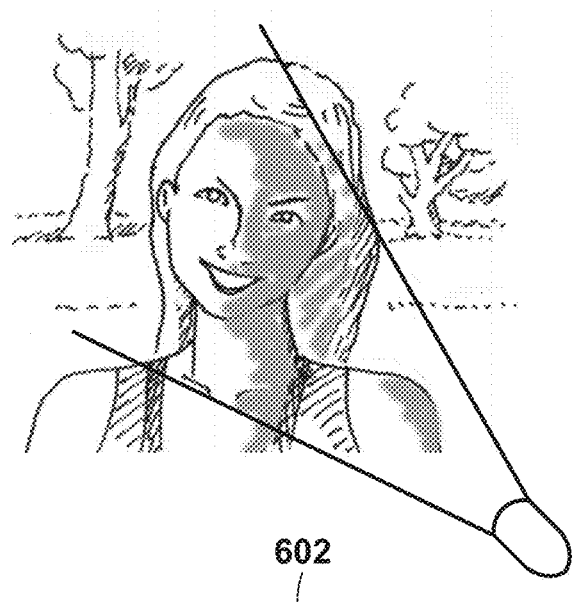
Figure 6C:
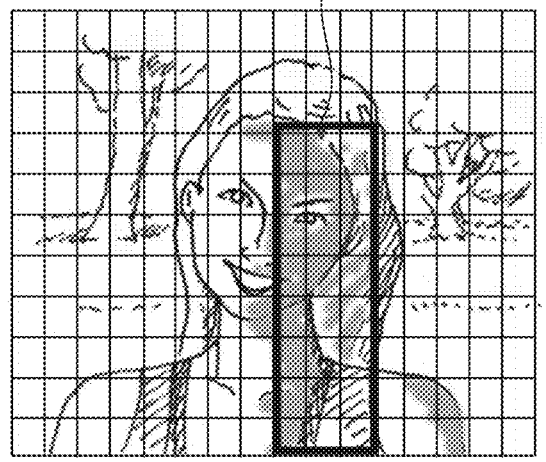

In step S502, the system control unit 50 determines an irradiation region (target region) of the virtual light source and a signal gain ($\alpha$). For example, the system control unit 50 acquires position information of a face region of the object output by the face detection unit 113 (FIG. 1). The acquired face region of the object is a face region 601 of FIG. 6A, for example. The system control unit 50 calculates, for each block of the face region 601, the luminance Y of the block from the evaluation value (average value of RGB values) of the block, and acquires the luminance distribution of the face region 601. The system control unit 50 extracts a shadow region that is relatively dark from the luminance distribution of the face region 601, and calculates an angle of the virtual light source that brightens the shadow region. In the example of FIG. 6A, there are shadows on the right side facing the object. Thus, as shown in FIG. 6B, the system control unit 50 determines the position and direction of the virtual light source so as to irradiate the virtual light source from right side facing the object. At this time, the system control unit 50 calculates the region where the light of the virtual light source will hit the object, based on the position and direction of the virtual light source. An example of the region to be irradiated with the light of the virtual light source is shown in FIG. 6C. In FIG. 6C, an irradiation region 602 (target region) indicates a region of the object in block units to be irradiated with the light of the virtual light source. As a result of such processing, the irradiation region is determined such that the shadow region in a predetermined region (e.g., face region 601) of the object included in the shot image is irradiated. Also, the system control unit 50 determines the signal gain ($\alpha$) such that the irradiation region 602 will be an appropriate brightness.

In step S503, the system control unit 50 identifies a target color of white balance. The target color of white balance here refers to a color that pixels of the shot image corresponding to an object having a specific color are to have as a result of white balance processing performed on this shot image. The specific color is white, for example, but may be another color. In the case where the white balance is set so as to reproduce the color of an object faithfully, the color of pixels of the shot image corresponding to a white object should be white as a result of white balance processing. Accordingly, the target color in this case is white. The system control unit 50 identifies the target color corresponding to the specific color, based on the contents of the white balance processing performed on the shot image by the image processing unit 105.

Note that the system control unit 50 is able to perform white balance processing on shot images with the image processing unit 105, using any known technology. Also, the system control unit 50 is able to identify the target color based on the contents of white balance processing, using any known technology.

Also, the system control unit 50 may determine the specific color based on the type of object referred to in order to determine the irradiation region in step S502 (i.e., according to the irradiation target of the virtual light source). For example, in the case where the type of object is a face as in FIGS. 6A to 6C, the system control unit 50 may use skin color as the specific color. In the case where the white balance is set so as to faithfully reproduce the color of the object, the pixels of the shot image corresponding to a skin color object would be expected to be skin color as a result of white balance processing. Accordingly, the target color in this case is skin color.

Also, the system control unit 50 may identify a plurality of target colors corresponding to a plurality of specific colors. In the following description, it is assumed that the specific colors are white and skin color, with skin color being determined based on the fact that the irradiation target of the virtual light source is a face. Also, it is assumed that white and skin color are identified as the target colors corresponding to these two specific colors, with white being preferentially used out of these two target colors.

In step S504, the system control unit 50 extracts a region having the target color (white) from the irradiation region 602 (target region) of the virtual light source determined in step S502. For example, the system control unit 50 extracts an achromatic color region that is greater than or equal to a predetermined luminance as a region having the target color (white).

Extraction of the achromatic color region will now be described with reference to FIG. 7A. As aforementioned, FIG. 7A is a graph showing the color distribution, with R/G taken on the horizontal axis and B/G taken on the vertical axis. Since R=G=B in the case of an achromatic color, a range in the vicinity of 1 will be an achromatic color on both the vertical axis and the horizontal axis. In the present embodiment, the system control unit 50 judges that a block is an achromatic color block, in the case where the color of the block is in a range 701 in the vicinity of the achromatic color shown in FIG. 7A, and the luminance of the block is greater than or equal to a predetermined luminance. The system control unit 50 counts the number of achromatic color blocks. Also, the system control unit 50 calculates the average values (Rw, Gw, Bw) of the RGB values of all the achromatic color blocks, and calculates Rw/Gw and Bw/Gw from the average values (Rw, Gw, Bw). An example of the calculated Rw/Gw and Bw/Gw is shown at a position 702 of FIG. 7A.

In step S505, the system control unit 50 determines whether the number of achromatic color blocks is greater than or equal to a predetermined threshold value. If the number of achromatic color blocks is greater than or equal to the predetermined threshold value, the processing advances to step S507, and if not, the processing advances to step S506.

In step S506, the system control unit 50 extracts a skin color region from the irradiation region 602 (target region) of the virtual light source determined in step S502. Here, since irradiation of the virtual light source on a person (face) is assumed, extraction using the skin color of the face is performed in the case where there are few achromatic color blocks.

Figure 7B:
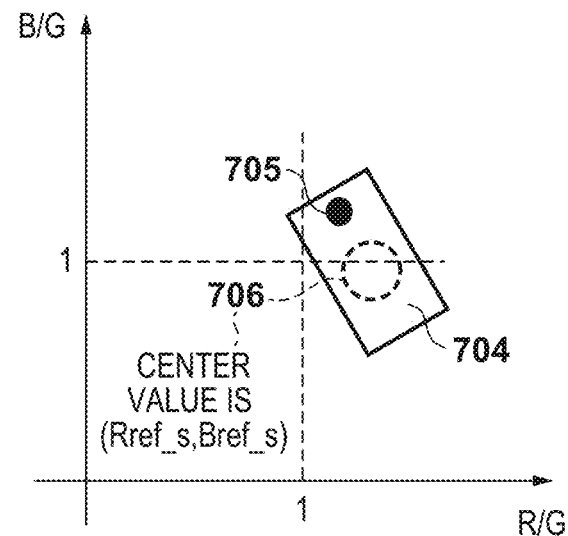
FIG. 7B is a diagram illustrating extraction of a skin color region.

Extraction of a skin color region will now be described, with reference to FIG. 7B. FIG. 7B is a graph showing the color distribution, with R/G taken on the horizontal axis and B/G taken on the vertical axis. Similarly to the case of extracting an achromatic color region described with reference to FIG. 7A, the system control unit 50 determines that a block is a skin color block, in the case where the color of the block is in a range 704 in the vicinity of skin color shown in FIG. 7B. Also, the system control unit 50 calculates the average values (Rs, Gs, Bs) of the RGB values of the all the skin color blocks, and calculates Rs/Gs and Bs/Gs from the average values (Rs, Gs, Bs). An example of the calculated Rs/Gs and Bs/Gs is shown in a position 705 of FIG. 7B.

In step S507, the system control unit 50 determines whether the target color block (skin color block if the processing of step S506 has been performed, and achromatic color block if not) that is included to the irradiation region 602 (target region) of the virtual light source diverges relative to a color center value serving as a reference. Specifically, the system control unit 50 determines whether (Rw/Gw, Bw/Gw) or (Rs/Gs, Bs/Gs) calculated in step S505 or step S506 diverges from an achromatic color center value or a skin color center value by greater than or equal to a predetermined threshold value.

FIG. 7A shows an example of an achromatic color center value and range. An achromatic color range 703 indicates the predetermined threshold value that is used in the determination of step S507, and the center of the circle is the center value (Rref_w, Bref_w) of the achromatic color. In the case where the white balance is correct for the ambient light, the point Rref_w=Bref_w=1 will be an achromatic color center. In cases such as where the white balance is intentionally shifted, however, the target color corresponding the achromatic color changes according to the amount of divergence of the white balance, and thus the achromatic color range 703 (more precisely, target color range) also changes. The system control unit 50 determines whether the position 702 of Rw/Gw and Bw/Gw is included in the achromatic color range 703. In the example of FIG. 7A, the position 702 of Rw/Gw and Bw/Gw is not included in the achromatic color range 703. In this case, the system control unit 50 determines that the target color block (achromatic color block) diverges relative to the color center value serving as a reference.

FIG. 7B shows an example of a skin color center value and range. A skin color range 706 indicates the predetermined threshold value used in the determination of step S507, and the center of the circle is a skin color center value (Rref_s, Bref_s). The skin color center value (Rref_s, Bref_s) corresponds to the target color of skin color identified in step S503. Alternatively, the system control unit 50 may determine the skin color center value serving as a reference based on the color of a skin color region that is directly irradiated with ambient light such as sunlight (i.e., may identify the target color based on the color of a skin color region that is directly irradiated with ambient light such as sunlight). The system control unit 50 determines whether the position 705 of Rs/Gs and Bs/Gs is included in the skin color range 706. In the example of FIG. 7B, the position 705 of Rs/Gs and Bs/Gs is not included in the skin color range 706. In this case, the system control unit 50 determines that the target color block (skin color block) diverges relative to the color center value serving as a reference.

If it is determined in step S507 that the target color block diverges relative to the color center value serving as a reference, the processing advances to step S508, and if not, the processing advances to step S510.

In step S508, the system control unit 50 calculates a color gain (Rcolor, Bcolor) that approximates (Rw/Gw, Bw/Gw) or (Rs/Gs, Bs/Gs) to the achromatic color center value or the skin color center value in the irradiation region 602 of the virtual light source. Specifically, if the number of achromatic color blocks is greater than or equal to a predetermined threshold value ("YES" in step S505), the system control unit 50 calculates the color gain of the virtual light source, so as to approximate (Rw/Gw, Bw/Gw) to the achromatic color center value (Rref_w, Bref_w). The system control unit 50 calculates the color gain based on the following formula.

$$Rcolor = \left(\frac{Rref\_w}{(Rw/Gw)}\right)^2 \qquad \text{Formula 3}$$

$$Bcolor = \left(\frac{Bref\_w}{(Bw/Gw)}\right)^2$$

Also, if the number of achromatic color blocks is not greater than or equal to the predetermined threshold value ("NO" in step S505), the system control unit 50 calculates the color gain of the virtual light source based on the following formula, so as to approximate (Rs/Gs, Bs/Gs) to the skin color center value (Rref_s, Bref_s).

$$Rcolor = \left(\frac{Rref\_s}{(Rs/Gs)}\right)^2 \qquad \text{Formula 4}$$

$$Bcolor = \left(\frac{Bref\_s}{(Bs/Gs)}\right)^2$$

In the case where the number of achromatic color blocks is greater than or equal to the predetermined threshold value, the region whose color is close to white in the irradiation region 602 is considered to be larger than the threshold value. In this case, processing for controlling the color of the virtual light source such that colors close to white approach white in the irradiation region 602 is performed (step S508). Also, in the case where the number of achromatic color blocks is not greater than or equal to the predetermined threshold value, the region whose color is close to white in the irradiation region 602 is considered to be smaller than the threshold value. In this case, processing for controlling the color of the virtual light source such that colors close to skin color approach skin color in the irradiation region 602 is performed (step S510).

In step S509, the system control unit 50 corrects the color gain (Rcolor, Bcolor) of the virtual light source calculated in step S508 based on the signal gain (α) of the virtual light source. This processing will now be described using FIGS. 8A to 8C.

FIG. 8A and FIG. 8B are diagrams showing the relationship between input signals and signals after the lighting by the virtual light source. In FIG. 8A and FIG. 8B, reference numerals 801 and 804 denote the original signals (Rin, Gin, Bin) prior to irradiating the virtual light source, and reference numerals 802 and 805 denote the reflection components (Ra, Ga, Ba) of the virtual light source to be added. Also, reference numerals 803 and 806 denote the output signals (Rout, Gout, Bout) after adding the reflection components of the virtual light source to the input signals.

Taking the original signals 801 shown in FIG. 8A as an example, the input signals have a small R signal component and a large B signal component. In order to correct these original signals 801 to the achromatic color, the system control unit 50 calculates a color gain (Rcolor, Bcolor) of the virtual light source that increases the R signal and reduces the B signal, with the aforementioned method described in step S508. The reflection component 802 is the reflection component of the virtual light source to which the color gain of the virtual light source has been added. As a result, as shown in the output signals 803, R:G:B approaches 1:1:1 compared with the original signal 801.

On the other hand, as shown in FIG. 8B, in the case where the signal gain (α) of the virtual light source is large compared with the original signals 804, the reflection components increase as shown in the reflection components 805, when the reflection components are generated with the aforementioned ratio of the color gain (Rcolor, Bcolor) of the virtual light source. In this case, the R signal conversely becomes too large, as shown in the example of the output signals 806. In view of this, in the case where the reflection components of the virtual light source to be added are larger than a predetermined threshold value, the system control unit 50 performs correction such that the color gain (Rcolor, Bcolor) of the virtual light source approaches 1. This correction function is shown in FIG. 8C. In FIG. 8C, the horizontal axis is the signal gain (α) of the virtual light source, and the vertical axis is the correction factor of the color gain of the virtual light source. In the case where the correction factor is 1, the color gain (Rcolor, Bcolor) calculated in step S508 is directly employed. The system control unit 50 performs correction such that (Rcolor, Bcolor) approaches 1 as the correction factor is lower.

Accordingly, the color gain that is ultimately used is determined based on the difference in the irradiation region between the average color of the region whose color is close to the target color and the target color (refer to Formulas 3 and 4) and the intensity of the virtual light source (refer to FIG. 8C).

Returning to FIG. 5, the system control unit 50, in step S510, sets the color gain (Rcolor, Bcolor) to 1 in the following manner, so as to not apply the color gain to the virtual light source.

$R\text{color}=1$ $B\text{color}=1$     Formula 5

In step S511, the system control unit 50 sets various parameters of the virtual light source including the color gain (Rcolor, Bcolor) in the virtual light source reflection component calculation unit 307 (FIG. 3). Since the color gain determined by the processing of steps S508 and S509 is set in the virtual light source reflection component calculation unit 307, the color of the virtual light source is controlled such that colors close to the target color approach the target color in the irradiation region 602 (target region).

As a result of the above processing, the parameters of the virtual light source including the parameters (Rcolor, Bcolor) for controlling the color of the virtual light source are set.

As described above, according to the first embodiment, the digital camera 100 performs image processing for adding the effect of virtual light irradiation by a virtual light source to an irradiation region (target region). At that time, the digital camera 100 identifies the target color of white balance, and controls the color of the virtual light source such that colors close to the target color approach the target color in the irradiation region (target region). It thereby becomes possible to suppress unnatural coloring in regions in which the effect of virtual light irradiation by a virtual light source is added.

Note that, in the present embodiment, a configuration was described in which the color gain (Rcolor, Bcolor) of the virtual light source is calculated, based on the amount of divergence between a reference value of an achromatic color or skin color and the color of the region to be irradiated with the virtual light source. However, the method of calculating the color gain of the virtual light source is not limited thereto. Any configuration may be adopted as long as control can be performed such that the color of the region to be irradiated with the virtual light source approaches a color irradiated with ambient light adjusted for white balance.

For example, a control that is based on the brightness of the object region to be irradiated with the virtual light source may be added. In the above description, the color of the virtual light source is determined utilizing the average value of the color of the object region, but a color need not be applied since the white balance is correct for the bright region irradiated with ambient light originally serving as the main light source. Thus, it is also possible to adopt a configuration in which the aforementioned color control is only performed on dark regions. In this case, control is performed for strengthening the color control as the region to be irradiated with the virtual light source is darker.

In the present embodiment, a configuration was described in which the difference between a reference value of an achromatic color or skin color and the color of an object region that the virtual light source hits is accurately calculated, but it is also possible to adopt a configuration in which control is carried out without accurately calculating the difference from a target color. For example, it is also possible to calculate the color temperature of ambient light at the time of calculating the white balance coefficient, and control the color of the virtual light source based on the color temperature of ambient light. For example, in the case where the color temperature of ambient light is low and it is judged that the color of the region to be irradiated with the virtual light source has a blue tinge, the color gain of the virtual light source is set to a predetermined rate (red is enhanced and blue is softened). Since the color of the object irradiated with the virtual light source thereby approaches the color irradiated by the ambient light adjusted for white balance, it becomes possible to reduce any unnaturalness.

It is also possible to adopt a configuration in which it is determined whether the scene is one in which a difference in color tends to occur in shadow parts of the object from the case where ambient light hits the object directly, utilizing the color temperature of ambient light and the irradiation direction of ambient light, and the color of the virtual light source is controlled according to the determination result. For example, it is determined whether the object to which the virtual light source will be applied is backlit or obliquely lit with ambient light. In the case where the object is backlit or obliquely lit and the color temperature of ambient light is lower than a predetermined color temperature, the color gain of the virtual light source is set as a predetermined rate (red is enhanced and blue is softened). It is thereby possible to approximate the color of the object region that is irradiated with the virtual light source to the color irradiated with ambient light adjusted for white balance.

Also, in the present embodiment, a configuration was described in which the color of the region that the light source hits is directly extracted and the color gain of the virtual light source is determined, but any method may be used as long as the color of the region that the light source hits can be estimated. For example, it is also possible to adopt a method that involves dividing the entire screen into bright regions and dark regions, and extracting a color distribution of achromatic color. In the case where there is a difference in color between the bright regions and the dark regions, a color gain that approximates the dark regions to the color of the bright regions is set as the color gain of the virtual light source.

In the present embodiment, description was given taking the case where there is one virtual light source as an example, but it is also possible to adopt a configuration in which a plurality of virtual light sources are installed. In this case, the color of the irradiation region is detected for each of the plurality of virtual light sources, and the color of the virtual light sources is determined in accordance with the processing flow of FIG. 5. In the case where a plurality of virtual light sources hit the same object region, in step S509 of FIG. 5, the correction factor of the color gain is determined based on the total gain of the plurality of virtual light sources.

In the present embodiment, a configuration was described in which the correction factor of the color gain is determined based on the amount of gain for raising the luminance with a virtual light source, but it is also possible to adopt a configuration in which the amount of correction of the color is determined with consideration also for the amount of change in luminance in the case where the luminance is changed by processing other than the virtual light source. For example, in the case of raising the gain of dark parts as backlight correction, it is also possible to adopt a configuration in which the correction factor of the color gain is determined based on the total gain of the gain increase due to backlight correction and the gain increase due to the virtual light source.

Second Embodiment

In the first embodiment, a configuration was described in which the color of the object after being irradiated with the virtual light source is controlled, by controlling the color gain of the virtual light source. In the second embodiment, an example of a configuration in which the color of the object after being irradiated with the virtual light source is controlled by performing WB processing (white balance processing) locally on the region that is irradiated with the virtual light source will be described.

In the second embodiment, the basic configuration of the digital camera 100 and the image processing unit 105 is similar to the first embodiment (refer to FIGS. 1 and 2). In the second embodiment, the configuration of the relighting processing unit 114 differs from the first embodiment. Hereinafter, the differences from the first embodiment will be mainly described.

Figure 9:
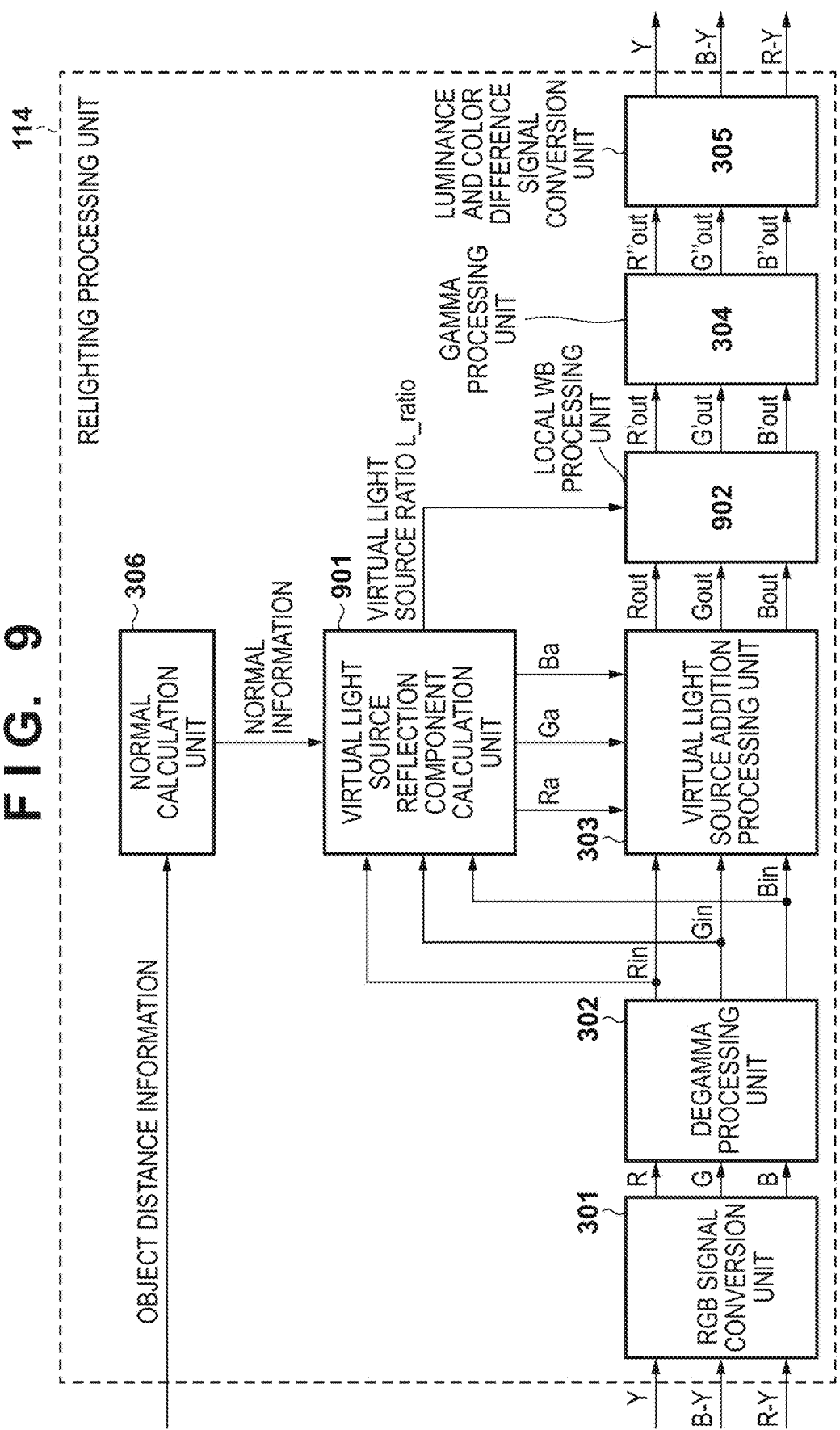
FIG. 9 is a block diagram showing a configuration of a relighting processing unit 114 according to a second embodiment.

FIG. 9 is a diagram showing the configuration of the relighting processing unit 114 according to the second embodiment. The relighting processing unit 114 according to the second embodiment is provided with a virtual light source reflection component calculation unit 901 instead of the virtual light source reflection component calculation unit 307, and is additionally provided with a local WB processing unit 902.

The virtual light source reflection component calculation unit 901 calculates the reflection component of the virtual light source based on the following formula.

$$Ra = \alpha \times \frac{(-L \cdot N)}{K^2} \times Rin \qquad \text{Formula 6}$$

$$Ga = \alpha \times \frac{(-L \cdot N)}{K^2} \times Gin$$

$$Ba = \alpha \times \frac{(-L \cdot N)}{K^2} \times Bin$$

In the above formula, the parameters have a similar meaning to the first embodiment. That is, α denotes the magnitude of the gain of the virtual light source (intensity of the virtual light source), L denotes a three-dimensional direction vector of the virtual light source, N denotes a three-dimensional normal vector of the object, and K denotes the distance between the virtual light source and the object.

Also, the virtual light source reflection component calculation unit 901 calculates a virtual light source ratio (L_ratio) with respect to the original image signal, based on the following formula.

$$L\_ratio = Ga/Gin \qquad \text{Formula 7}$$

Figure 10:
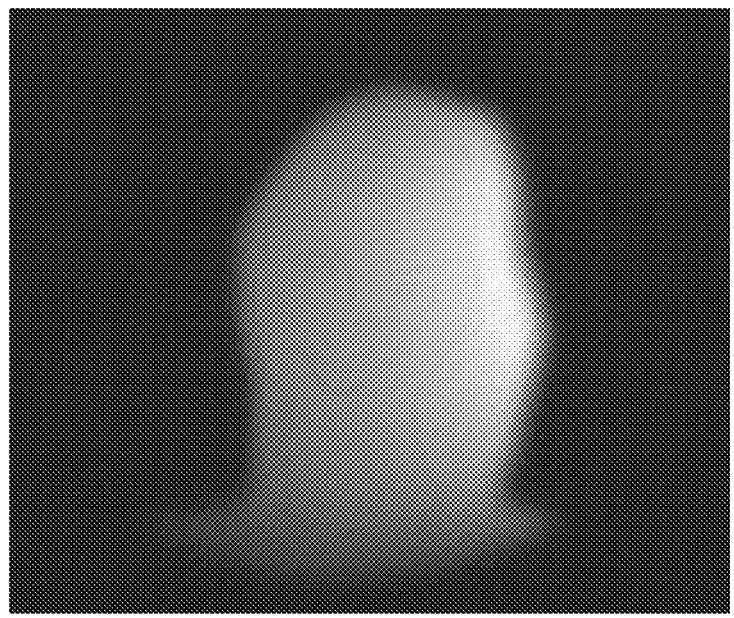
FIG. 10 is a diagram showing an example of a virtual light source ratio L ratio.

This virtual light source ratio (L_ratio) indicates a ratio as to the magnitude of the reflection component of the virtual light source to be added to the original image signal that is input (degree of contribution to the effect of virtual light irradiation on the pixel values of the irradiation region to which the effect is added). When the virtual light source ratio (L_ratio) is 1, this indicates that a reflection component of the virtual light source of the same magnitude as the original signal has been added. An example of the calculated virtual light source ratio L_ratio is shown in FIG. 10. FIG. 10 indicates that the reflection component of the virtual light source relative to the original image signal is greater as the pixels are brighter.

The virtual light source reflection component calculation unit 901 outputs the virtual light source ratio (L_ratio) to the local WB processing unit 902 together with outputting the reflection component (Ra, Ga, Ba) of the calculated virtual light source to the virtual light source addition processing unit 303.

The local WB processing unit 902, in a processing flow that will be described later, performs white balance processing on pixels that the virtual light source hits, based on the white balance gain (R-Gain, B-Gain) calculated beforehand and the virtual light source ratio (L_ratio).

Figure 11:
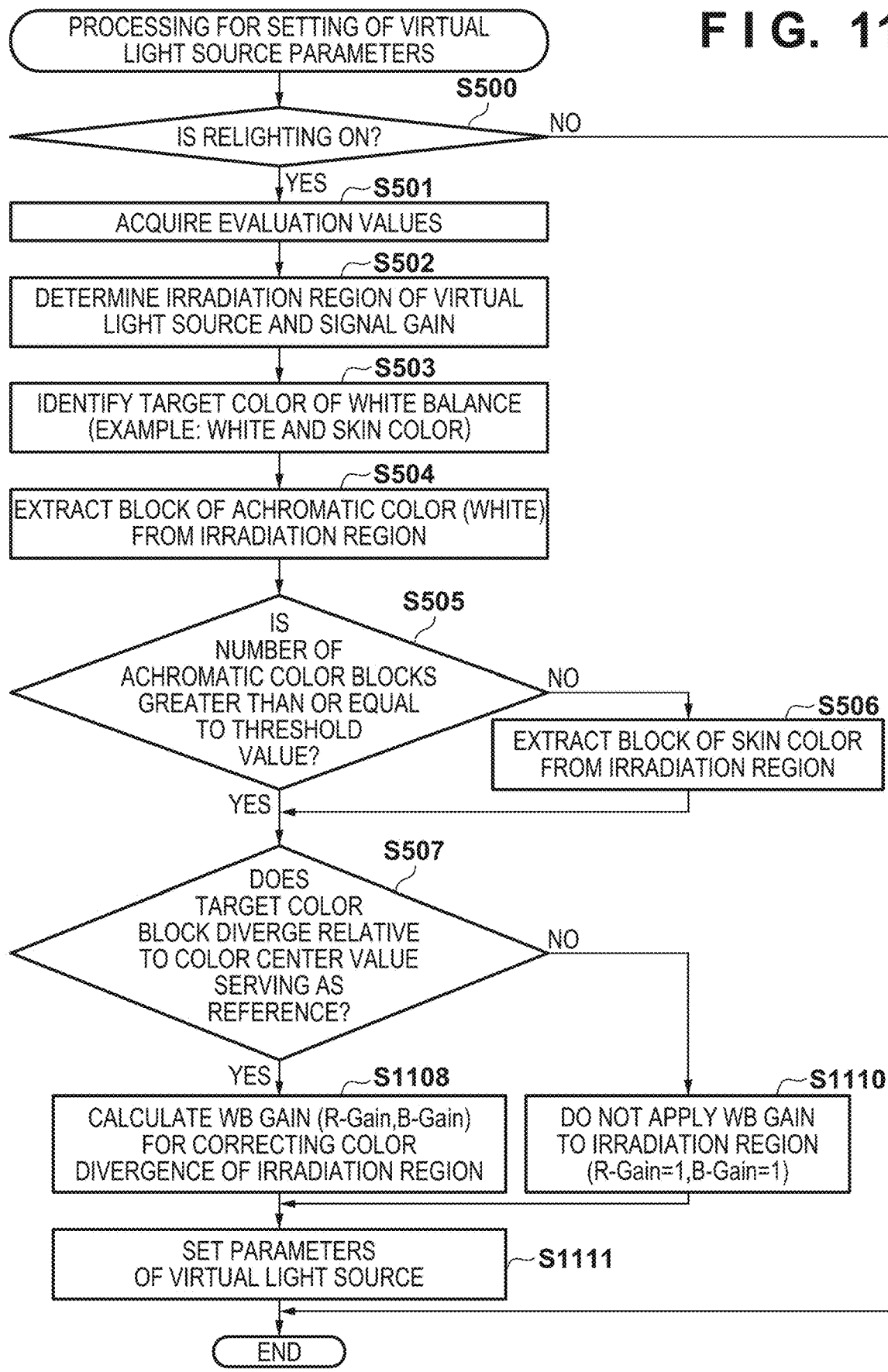
FIG. 11 is a flowchart of processing for setting virtual light source parameters according to the second embodiment.

The processing flow for setting the parameters of the virtual light source, including processing for calculating the white balance gain (WB gain) will now be described, with reference to FIG. 11. The processing of the steps of the flowchart of FIG. 11 is realized by the system control unit 50 executing a program stored in the nonvolatile memory 121, unless stated otherwise. The processing of this flowchart starts when processing by the image processing unit 105 on the shot image is completed.

In FIG. 11, the WB gain (R-Gain, B-Gain) being calculated instead of the color gain (Rcolor, Bcolor) of the virtual light source in step S1108 and step S1110 differs from the first embodiment. Also, it is assumed that correction of the color gain of the virtual light source that was performed in step S509 of FIG. 5 is not performed.

If it is determined in step S507 that the target color block diverges relative to the color center value serving as a reference, the processing advances to step S1108, and if not, the processing advances to step S1110.

In step S1108, the system control unit 50 calculates a WB gain (R-Gain, B-Gain) that approximates (Rw/Gw, Bw/Gw) or (Rs/Gs, Bs/Gs) to the achromatic color center value or skin color center value in the irradiation region 602 of the virtual light source. Specifically, if the number of achromatic color blocks is greater than or equal to a predetermined threshold value ("YES" in step S505), the system control unit 50 calculates the WB gain based on the following formula, so as to approximate (Rw/Gw, Bw/Gw) to the achromatic color center value (Rref_w, Bref_w).

$$R - \text{Gain} = \frac{\text{Rref\_w}}{(Rw/Gw)} \quad \text{Formula 8}$$

$$B - \text{Gain} = \frac{\text{Bref\_w}}{(Bw/Gw)}$$

Also, if the number of achromatic color blocks is not greater than or equal to the predetermined threshold value ("NO" in step S505), the system control unit 50 calculates the WB gain based on the following formula, so as to approximate (Rs/Gs, Bs/Gs) to the skin color center value (Rref_s, Bref_s).

$$R - \text{Gain} = \frac{\text{Rref\_s}}{(Rs/Gs)} \quad \text{Formula 9}$$

$$B - \text{Gain} = \frac{\text{Bref\_s}}{(Bs/Gs)}$$

In this way, the WB gain is determined based on the difference in the irradiation region between the average color of the region whose color is close to the target color and the target color.

On the other hand, in step S1110, the system control unit 50 sets both R-Gain and B-Gain to 1, such that white balance processing by the local WB processing unit 902 is not performed.

In step S1111, the system control unit 50 sets the various parameters of the virtual light source in the virtual light source reflection component calculation unit 901 (FIG. 9).

As a result of the above processing, the WB gain (R-Gain, B-Gain) is calculated, together with the parameters of the virtual light source being set.

The local WB processing unit 902 corrects the WB gain calculated as described above in pixel units based on the virtual light source ratio (L_ratio). Correction that is based on the virtual light source ratio (L_ratio) will now be described. Since pixels that the virtual light source does not hit very much (small L_ratio) do not greatly affect the input image, the local WB processing unit 902 performs control such that the degree of white balance adjustment decreases with respect to these pixels. On the other hand, with respect to pixels that the virtual light source hits strongly (large L_ratio), the local WB processing unit 902 performs control such that the degree of white balance adjustment increases. In this way, the local WB processing unit 902 controls the degree of white balance adjustment, based on the virtual light source ratio (L_ratio) (degree of contribution to the effect of virtual light irradiation on the pixel values of the irradiation region to which the effect is added).

Figure 12:
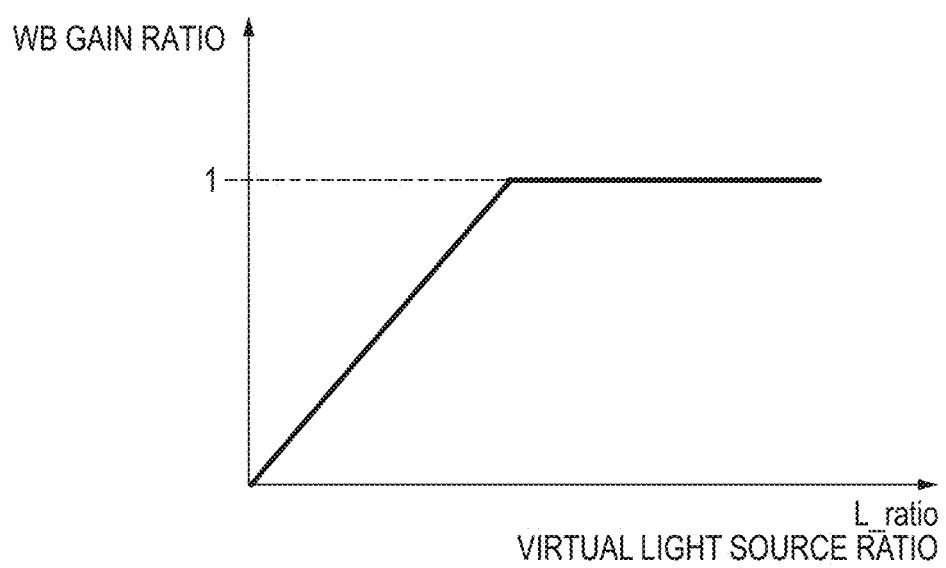
FIG. 12 is a diagram showing a characteristic example of WB gain correction.

FIG. 12 is a diagram showing a characteristic example of WB gain correction. In FIG. 12, the horizontal axis shows the virtual light source ratio (L_ratio), and the vertical axis shows the WB gain rate. The WB gain rate is a rate for setting the WB gain calculated in step S1108 directly when the WB gain rate is 1, and performing control so as to not perform WB processing as the WB gain rate approaches 0. The WB coefficient will be 1 when the WB gain rate is 0, and no WB processing will be applied.

The local WB processing unit 902 multiplies the signals to which the reflection components of the virtual light source have been added by the WB gain (R'-Gain, B'-Gain) after correction calculated in pixel units as described above.

$$R'\text{out} = R\text{out} \times R'\text{-Gain}$$

$$G'\text{out} = G\text{out}$$

$$B'\text{out} = B\text{out} \times B'\text{-Gain} \quad \text{Formula 10}$$

As described above, according to the second embodiment, the digital camera 100 performs image processing for adding the effect of virtual light irradiation by a virtual light source to an irradiation region (target region). At that time, the digital camera 100 identifies the target color of white balance, and adjusts the white balance of the irradiation region to which the effect of virtual light irradiation has been added such that colors close to the target color approach the target color. The digital camera 100 controls the degree of this white balance adjustment, based on the degree of contribution to the effect of virtual light irradiation on the pixel values of the irradiation region to which the effect is added. It thereby becomes possible to suppress the unnatural coloring of regions to which the effect of virtual light irradiation by a virtual light source is added.

Note that, in the above description, WB processing is performed by being divided into two stages (WB amplification unit 201 of FIG. 2, and local WB processing unit 902 of FIG. 9), but it is also possible to adopt a configuration in which the WB processing is performed collectively by the WB amplification unit 201. In that case, the processing of the evaluation value generation unit 208 and the processing of the virtual light source reflection component calculation unit 901 need to be performed prior to the processing of the WB amplification unit 201.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-237617, filed on Dec. 19, 2018, which is hereby incorporated by reference herein in its entirety.

What is claimed is:

1. An image processing apparatus comprising at least one processor and/or circuit configured to function as following units:
   an identification unit configured to identify a target color that a pixel of a shot image corresponding to an object having a specific color is to have as a result of white balance processing performed on the shot image;
   a determination unit configured to determine a target region of a virtual light source in the shot image;
   an image processing unit configured to perform image processing for adding an effect of virtual light irradiation by the virtual light source to the target region; and
   a control unit configured to control a color of the virtual light source such that a color close to the target color approaches the target color in the target region.

2. The image processing apparatus according to claim 1, wherein the determination unit is configured to determine the target region such that a shadow region in a region of a predetermined object included in the shot image is irradiated.

3. The image processing apparatus according to claim 2, wherein the identification unit is configured to determine the specific color based on a type of the predetermined object.

4. The image processing apparatus according to claim 1, wherein the control unit is configured to control the color of the virtual light source such that the color close to the target color approaches the target color in the target region, based on (i) a difference between an average color of a region, in the target region, having the color close to the target color and the target color and (ii) an intensity of the virtual light source.

5. The image processing apparatus according to claim 1, wherein the identification unit is configured to identify a first target color that a pixel of the shot image corresponding to an object having a first specific color is to have as a result of white balance processing performed on the shot image, and a second target color that a pixel of the shot image corresponding to an object having a second specific color is to have as a result of white balance processing performed on the shot image, and the control unit is configured to, in a case where a region whose color is close to the first target color in the target region is larger than a threshold value, control the color of the virtual light source such that the color close to the first target color approaches the first target color in the target region, and, in a case where the region whose color is close to the first target color in the target region is smaller than the threshold value, control the color of the virtual light source such that a color close to the second target color approaches the second target color in the target region.

6. The image processing apparatus according to claim 5, wherein the determination unit is configured to determine the target region such that a shadow region in a region of a predetermined object included in the shot image is irradiated,
the first specific color is white, and
the identification unit is configured to determine the second specific color based on a type of the predetermined object.

7. The image processing apparatus according to claim 1, wherein the identification unit identifies white or skin color as the target color.

8. The image processing apparatus according to claim 1, wherein in the case where the object having the specific color is a face, the identification unit identifies skin color as the target color.

9. The image processing apparatus according to claim 1, wherein the identification unit identifies white and skin color as the target color, the white being used preferentially.

10. An image capturing apparatus comprising:
    the image processing apparatus according to claim 1; and
    at least one processor and/or circuit configured to function as following units:
        an image capturing unit configured to generate the shot image; and
        a white balance unit configured to perform white balance processing on the shot image generated by the image capturing unit.

11. An image processing method executed by an image processing apparatus, comprising:
    identifying a target color that a pixel of a shot image corresponding to an object having a specific color is to have as a result of white balance processing performed on the shot image;
    determining a target region of a virtual light source in the shot image;
    performing image processing for adding an effect of virtual light irradiation by the virtual light source to the target region; and
    controlling a color of the virtual light source such that a color close to the target color approaches the target color in the target region.

12. A non-transitory computer-readable storage medium which stores a program for causing a computer to execute an image processing method comprising:
    identifying a target color that a pixel of a shot image corresponding to an object having a specific color is to have as a result of white balance processing performed on the shot image;
    determining a target region of a virtual light source in the shot image;
    performing image processing for adding an effect of virtual light irradiation by the virtual light source to the target region; and controlling a color of the virtual light source such that a color close to the target color approaches the target color in the target region.

* * * * *